Patented Dec. 28, 1948

2,457,696

UNITED STATES PATENT OFFICE 2,457,696

SYNTHESIS OF UNSATURATED KETONES

George E. Lukes and Ralph C. Swann, Skokie, Ill., assignors to The Pure Oil Company, Chicago, Ill., a corporation of Ohio No Drawing. Application June 15, 1944, Serial No. 540,542

23 Claims. (Cl. 260—597)

This invention relates to the synthesis of unsaturated ketones by reaction of fatty acid anhydrides and olefinic hydrocarbons.

An object of the invention is to prepare unsaturated ketones.

Another object of the invention is to provide a catalyst capable of promoting the reaction of olefins and fatty acid anhydrides to form unsaturated ketones.

A further object of the invention is to provide a method for preparing unsaturated ketones.

Other objects of the invention will be apparent from the following description.

We have discovered that unsaturated ketones can be synthesized from fatty acid anhydrides and olefinic hydrocarbons in the presence of a catalyst selected from the group consisting of aryl sulfonic acids, halo-sulfonic acids, sulfo-fatty acids, particularly sulfo low-boiling fatty acids including reagents which are capable of forming sulfo-fatty acids, such as the combination of sulfamic and acetic acids.

As examples of susbtances which will catalyze the reaction in accordance with our invention, may be mentioned benzene m-disulfonic acid, benzene sulfonic acid, B-naphthalene sulfonic acid, p,p' diphenyl disulfonic acid, 2,5 dichlorbenzene sulfonic acid, 2,4 dinitrobenzene sulfonic acid, sulfo-acetic acid, chloro-sulfonic acid, fluorosulfonic acid and a mixture of sulfamic and acetic acids. By the term aryl sulfonic acids, it is intended to include those compounds which have alkyl groups attached to the benzene ring. The sulfonic acids should not contain hydroxy groups attached to benzene ring since such groups appear to inhibit the catalytic effect of the compound. Polysulfonic acids appear to be more active than monosulfonic acids.

When using halo-sulfonic acids as catalyst, the catalyst reacts with a portion of the anhydride to form sulfo-acetic acid which catalyzes the reaction. When using sulfamic acids, acetic acid should be present in the mixture in order that the sulfamic acid may react therewith to form the sulfo-acetic acid which catalyzes the reaction.

In carrying out the synthesis, the olefin and anhydride will be selected in accordance with the ketone desired. For example, where it is desired to form methyl diisobutylene ketone, acetic anhydride will be reacted with diisobutylene. Although the ratio of olefin to fatty acid anhydride may be varied within wide limits, best yields of ketones are obtained when the ratio of the anhydride to the olefin is approximately 2 to 1.

Good yields may be obtained based on the olefin with ratios of olefin to anhydride of 2 to 1 to ratio of 1 to 4. We prefer a molal excess of anhydride over the olefin.

The amount of catalyst present will somewhat vary with the activity of the catalyst and the period of contact. The quantity of catalyst will vary inversely with length of contact time. With the more active catalyst, such as benzene m-disulfonic acid, catalyst portions should be kept low particularly in batch type operations. As an example, in the neighborhood of 10 mole percent or less of benzene m-disulfonic acid based on the olefin is sufficient in a batch operation. Larger amounts of the more active catalysts tend to promote side reactions which reduce the yield of the ketone. With less active catalyst, such as p-toluene sulfonic acid, catalyst may be used in batch operations in mole percents up to 50 or more based on the olefin without serious difficulty from side reactions.

The reaction is preferably carried out at temperatures ranging from approximately atmospheric to 300° F. At lower temperatures the reaction proceeds rather slowly. The time of reaction will depend somewhat on the intimacy of contact between the reagents and the temperature at which the reaction is carried out and may vary from a few minutes to twenty hours or longer. Where the process is carried out by mixing the catalyst and reagents in a mixing vessel by means of a stirring device, contact times of one and one-half to eighteen hours have been found to be sufficient to give good yields of ketones.

The reaction may take place under superatmospheric pressure in order to keep the reactants in liquid phase or may be carried out at pressures sufficiently low to permit boiling of the reaction mixture and refluxing thereof.

In order to speed up the reaction, the reactants may be recycled from a tank to a mixing device such as a Stratco agitator and through a heater back to the tank until the desired degree of conversion has taken place. The reaction may be carried out semi-continuously by feeding a stream of liquid olefins to the circulating mixture of catalyst, anhydride and reaction product.

The reaction may be carried out continuously by preparing a mixture of anhydride and catalyst and contacting it in a body or in a countercurrent stream with a continuous stream of olefins at temperatures sufficiently high to keep the olefin in gaseous or vapor phase. If countercurrent contact is used, the anhydride and catalyst may be cycled from the bottom to the top of the treating tower until the anhydride is completely converted, upon which it may be withdrawn and fresh anhydride and catalyst charged to the tower.

Another method for continued operation is to impregnate a solid, porous carrier, such as fuller's earth, bauxite, activated alumina or silica gel, with the catalyst and pass a mixture of olefin and anhydride through the catalyst bed either concurrently or countercurrently. Where continuous operation is resorted to, the reaction should be conducted at temperatures approaching the upper end of the reaction temperature range.

The following examples will illustrate the invention:

Example I

One mole of crude diisobutylene, having a boiling range of 180 to 250° F., was mixed with 2 moles of acetic anhydride of 90–95% purity in the presence of 0.1 mole of benzene m-disulfonic acid, at a temperature of 160° F., for a period of five hours. At the end of the treating period, the mixture was cooled and poured into water in order to hydrolyze any excess acetic anhydride. The hydrocarbon layer was then then separated from the aqueous layer, washed with 10% sodium hydroxide solution and then with distilled water. The washed hydrocarbon layer was then fractionated at atmospheric pressure. A yield of methyl diisobutylene ketone amounting to 40.6% by weight on the original diisobutylene was obtained.

Example II

The same reactants and catalyst as in Example I were mixed and heated under reflux at a temperature of 220 to 240° F. for four hours. In this experiment 0.2 mole of catalyst per mole of diisobutylene was used. The yield of ketone based on diisobutylene was only 4.1% by weight.

Example III

This experiment was identical with Example II, except that .0168 mole of catalyst was used per mole of diisobutylene. The yield of ketone based on diisobutylene was 30.8% by weight.

Example IV

One mole of diisobutylene, 2 moles of acetic anhydride and 0.1 mole of B-naphthalene sulfonic acid were heated under reflux for six hours. After cooling, washing and fractionating as in Example I, a yield of 31.2% by weight of ketone based on diisobutylene was obtained.

Example V

One mole of diisobutylene, 2 moles of acetic anhydride and 0.1 mole of benzene sulfonic acid were heated under reflux for four hours. Upon cooling, washing and fractionating as in Example I, a yield of 26% by weight of ketone based on diisobutylene was obtained.

Example VI

One mole of diisobutylene, 2 moles of acetic anhydride and 0.4 mole of p-toluene sulfonic acid were heated to 140° for ten hours. After cooling, washing and fractionating, a yield of 38.3% by weight of ketone based on diisobutylene was obtained.

Example VII

Three moles of diisobutylene were heated with 1.5 moles of acetic anhydride in the presence of 0.2 mole of p-toluene sulfonic acid at a temperature of 200° F. for sixteen hours. A yield of 18.3% by weight of ketone based on the acetic anhydride was obtained.

Example VIII

One mole of diisobutylene, 2 moles of acetic anhydride and 0.2 mole of p-toluene sulfonic acid were heated to 160° F. for four hours. A yield of 38% by weight of ketone based on the diisobutylene used was obtained.

Other experiments conducted with the same catalyst in smaller quantities demonstrated that the yield of ketone gradually decreased as the amount of catalyst decreased.

Example IX

One mole of diisobutylene, 2 moles of acetic anhydride and 0.1 mole of p,p'-diphenyl-disulfonic acid were refluxed for four hours. After cooling and treating as in Example I, a yield of 28.4% by weight of ketone based on the diisobutylene was obtained.

Example X

Three moles of diisobutylene, 4 moles of acetic anhydride, 0.5 mole of acetic acid and 0.5 mole of sulfamic acid were refluxed together for 7.5 hours. After cooling, washing and fractionating, as in Example I, a yield of 32% by weight of ketone based on the diisobutylene used was obtained.

Example XI

Two moles of diisobutylene, 4 moles of acetic anhydride and 10 cc. of chlorosulfonic acid were mixed together in the following manner: the chlorosulfonic acid and the acetic anhydride were preheated for 20 minutes at 228° F. The diisobutylene was then added and the mixture was refluxed for four hours. After cooling, washing and fractionating, as in Example I, a yield of ketone of 34% based on the diisobutylene used was obtained.

Example XII

One mole of diisobutylene, 2 moles of acetic anhydride and .01 mole of 2,5-dichlorobenzene sulfonic acid were mixed for six hours at 80° F. The mixture was treated as in Example I, and gave a ketone yield of 28% by weight based on the diisobutylene.

Although in the foregoing examples, acetic anhydride and diisobutylene were used in each case, these compounds were used only because they were readily available and enabled a comparison to be formed between the various catalysts. The process is applicable to other olefins, such as propylene, butylene, amylene and triisobutylene, and the process is applicable to other fatty acid anhydrides, such as propionic anhydride, butyric anhydride and valeric anhydride.

Unsaturated ketones prepared in accordance with my invention are useful as starting materials in the preparation of plastics, rubber and other substances.

We claim:

1. The method of synthesizing unsaturated ketones comprising contacting an open-chain olefinic hydrocarbon having at least 3 carbon atoms per molecule with a fatty acid anhydride in the presence of a catalyst selected from the group consisting of aryl sulfonic acids, sulfofatty acids and halo-sulfonic acids.

2. Method in accordance with claim 1 in which the catalyst is a non-hydroxylated aryl sulfonic acid.

3. Method in accordance with claim 1 in which the catalyst is an aryl disulfonic acid.

4. Method in accordance with claim 1 in which the catalyst is an aryl polysulfonic acid.

5. Method in accordance with claim 1 in which the catalyst is benzene m-disulfonic acid.

6. Method in accordance with claim 1 in which the catalyst is a sulfo-fatty acid.

7. Method in accordance with claim 1 in which the catalyst is sulfo-acetic acid.

8. The method of synthesizing unsaturated ketones comprising contacting a fatty acid anhydride with an open-chain olefinic hydrocarbon having at least 3 carbon atoms per molecule at temperatures ranging from approximately atmospheric to 300° F. with a catalyst selected from the group consisting of non-hydroxylated aryl sulfonic acids, sulfo-fatty acids and halo-sulfonic acids for a period of time sufficient to enable the anhydride and olefin to react to form a substantial amount of unsaturated ketone.

9. Method in accordance with claim 8 in which the olefin and the anhydride are contacted in a mole ratio of approximately 1 to 2.

10. Method in accordance with claim 8 in which ratio of the olefin to anhydride is less than 1:1.

11. Method in accordance with claim 8 in which the ratio of olefin to anhydride and the ratio of catalyst to olefin is less than 1:1.

12. Method in accordance with claim 8 in which the catalyst is a sulfonated aromatic hydrocarbon.

13. Method in accordance with claim 8 in which the catalyst is a polysulfonated aromatic hydrocarbon.

14. Method in accordance with claim 8 in which the catalyst is benzene m-disulfonic acid.

15. Method in accordance with claim 8 in which the catalyst is a sulfo-fatty acid.

16. Method in accordance with claim 8 in which the catalyst is a sulfo-acetic acid.

17. Method in accordance with claim 8 in which the catalyst is chlorosulfonic acid.

18. Method in accordance with claim 8 in which the catalyst is a halo-sulfonic acid.

19. Method in accordance with claim 8 in which the catalyst is sulfo-acetic acid formed in situ from a mixture of acetic acid and sulfamic acid.

20. The method of synthesizing unsaturated ketones comprising contacting a fatty acid anhydride with an olefin selected from the group consisting of propylene, butylene, amylene, di-isobutylene and tri-isobutylene at temperatures ranging from approximately atmospheric to 300° F. with a catalyst selected from the group consisting of non-hydroxylated aryl sulfonic acids, sulfo-fatty acids and halo-sulfonic acids for a period of time sufficient to enable the anhydride and olefin to react to form a substantial amount of unsaturated ketone.

21. Method in accordance with claim 20 in which the olefin is butylene.

22. Method in accordance with claim 20 in which the olefin is diisobutylene.

23. Method in accordance with claim 20 in which the olefin is triisobutylene.

GEORGE E. LUKES.
RALPH C. SWANN.

REFERENCES CITED

The following references are of record in the file of this patent:

Ebel; "Helv. Chim. Acta," vol. 10, pages 677–680 (1927).